United States Patent
Koike et al.

(10) Patent No.: US 6,891,615 B2
(45) Date of Patent: May 10, 2005

(54) CONICAL DIFFRACTION GRAZING INCIDENCE SPECTROMETER AND DIFFRACTION GRATING FOR USE IN THE SPECTROMETER

(75) Inventors: Masato Koike, Kyoto (JP); Kazuo Sano, Kyoto (JP); Yoshihisa Harada, Kyoto (JP)

(73) Assignee: Japan Atomic Energy Research Institute, Tokyo (JP)

( * ) Notice: Subject to any disclaimer, the term of this patent is extended or adjusted under 35 U.S.C. 154(b) by 271 days.

(21) Appl. No.: 10/191,993

(22) Filed: Jul. 10, 2002

(65) Prior Publication Data

US 2003/0016355 A1 Jan. 23, 2003

(30) Foreign Application Priority Data

Jul. 10, 2001 (JP) ........................................ 2001-246318

(51) Int. Cl.[7] ................................................. G01J 3/18
(52) U.S. Cl. ......................... 356/328; 356/334; 359/15; 359/16
(58) Field of Search .................................. 356/328, 334, 356/331; 359/15, 16, 569, 570, 572, 575; 378/84

(56) References Cited

U.S. PATENT DOCUMENTS

| 4,012,843 A | * | 3/1977 | Harada et al. ................ 33/19.2 |
| 4,241,999 A | * | 12/1980 | Pouey ......................... 356/331 |
| 4,455,088 A | | 6/1984 | Koike |
| 4,886,341 A | * | 12/1989 | Oishi et al. .................. 359/575 |
| 4,991,934 A | * | 2/1991 | Hettrick ....................... 359/570 |
| 5,052,766 A | * | 10/1991 | Noda et al. ................... 359/15 |
| 5,078,495 A | * | 1/1992 | Harada et al. ............... 356/334 |
| 5,274,435 A | | 12/1993 | Hettrick |
| 5,528,364 A | * | 6/1996 | Koike ......................... 356/334 |
| 5,978,110 A | * | 11/1999 | Koike .......................... 359/16 |

* cited by examiner

*Primary Examiner*—Layla Lauchman
(74) *Attorney, Agent, or Firm*—Banner & Witcoff, Ltd.

(57) ABSTRACT

A conical diffraction grazing incidence spectroscope for performing wavelength scanning by rotating a diffraction grating about an axis set parallel to groves in a grazing surface of the grating.

4 Claims, 5 Drawing Sheets

CONICAL DIFFRACTION GRAZING INCIDENCE SPECTROMETER AND DIFFRACTION GRATING FOR USE IN THE SPECTROMETER

This application is based upon and claims the benefit of priority from Japanese Patent Application No. 2001-246318, filed Jul. 10, 2001, the entire contents of this application are incorporated herein by reference.

BACKGROUND OF THE INVENTION

This invention relates to the designing of a conical diffracting oblique incidence spectroscope and a diffraction grating with non-uniformly spaced grooves that is suitable for the spectroscope.

In a conventional spectroscopic system using a diffraction grating to perform wavelength scan, the diffraction grating is rotated about an axis that is parallel to the grating grooves and which is perpendicular to the plane formed by the incident and the diffracted principal rays. A problem with this system is that as the angle of rotation increases, the shadowing effect, the phenomenon that a part of incident or diffracted beam is blocked by the grating facet, increases and the diffraction efficiency decreases with increasing wavelength. In order to overcome this difficulty, it has been proposed that wavelength scan be performed by rotating the diffraction grating about an axis normal to the grating surface (see, for example, U.S. Pat. No. 5,274,435 to M. C. Hettrick under the title of "Grating monochromators and spectrometers based on surface normal rotation, Monochromator with concave grating"). This method achieves some improvement in diffraction efficiency but, on the other hand, the wavelength scanning range is narrow and the resolving power decreases with increasing wavelength.

In another type of the conventional spectroscopic system which consists basically of a single diffraction grating, an entrance slit and an exit slit, and in which the plane formed by the centers of the entrance slit, the exit slit and the diffraction grating is not perpendicular to the direction of grooves in the diffraction grating. In this arrangement called "off-plane" mounting, substantial aberrations appear as long as the diffraction grating has uniformly spaced parallel grooves. As an improvement, it has been proposed to use a holographic concave diffraction grating having non-uniformly spaced, non-parallel grooves (U.S. Pat. No. 4,455,088 to M. Koike under the title of "Monochromator with concave grating"). However, even in this method, correction of aberrations is very difficult to achieve if it adopts the extreme "off-plane" mounting which is required by the grazing incidence spectroscope.

SUMMARY OF THE INVENTION

The present invention has been accomplished with a view to solving those problems of the prior art. Employing conical diffraction to prevent the decrease in diffraction efficiency due to the shadowing effect which is generally unavoidable from the grazing incidence spectrometer, this invention provides a diffraction grating designed as to minimize aberrations due to conical diffraction.

The invention also aims at providing a conical diffraction grazing incidence spectrometer using said diffraction grating.

These objects of the invention can be achived by a diffraction grating spectrometer comprising convergent light generating means which causes divergent light from a light source or through an entrance slit to be converted into convergent light, a diffraction grating positioned on an optical path from said light source to the focal point of said convergent light, and a wavelength scanning system of rotating said diffraction grating about an axis set parallel to the grooves in the grating surface, wherein the axis of rotation (y axis) of the diffraction grating, the incident principal ray and the diffracted principal ray are all in the same plane. The expansion coefficients of a groove function which is a series expansion describing the groove pattern of said diffraction grating are determined such that the expansion coefficients of an light path function describing the focal point and aberrations of a spectroscopic system including said diffraction grating are substantially zero at at least one wavelength in the wavelength scanning range.

With reference to FIG. 1, the sentence reading that "the axis of rotation (y axis) of the diffraction grating, the incident principal ray and the diffracted principal ray are all in the same plane" means that the center $O_N$ of an entrance slit 1, the center $O_X$ of an exit slit 4, the center $O_M$ of a concave mirror 2 and the center O of a diffraction grating 3 lie in the same plane.

In a conical diffraction grazing incidence spectroscopic system which performs wavelength scanning by rotating said diffraction grating about an axis set parallel to the grooves in the grating center, the present inventors determined the expansion coefficients of a groove function which was a series expansion describing the groove pattern of said diffraction grating such that the expansion coefficients of an light path function describing the focal point and aberrations of a spectroscopic system including said diffraction grating were substantially zero at at least one wavelength in the wavelength scanning range. With this design, the aberrations in the spectrometer could be sufficiently reduced and it provide better resolving power.

DETAILED DESCRIPTION OF THE INVENTION

The method of reducing aberrations using the expansion coefficients of the light path function is described below specifically with reference to the accompanying drawings.

Figure 1:
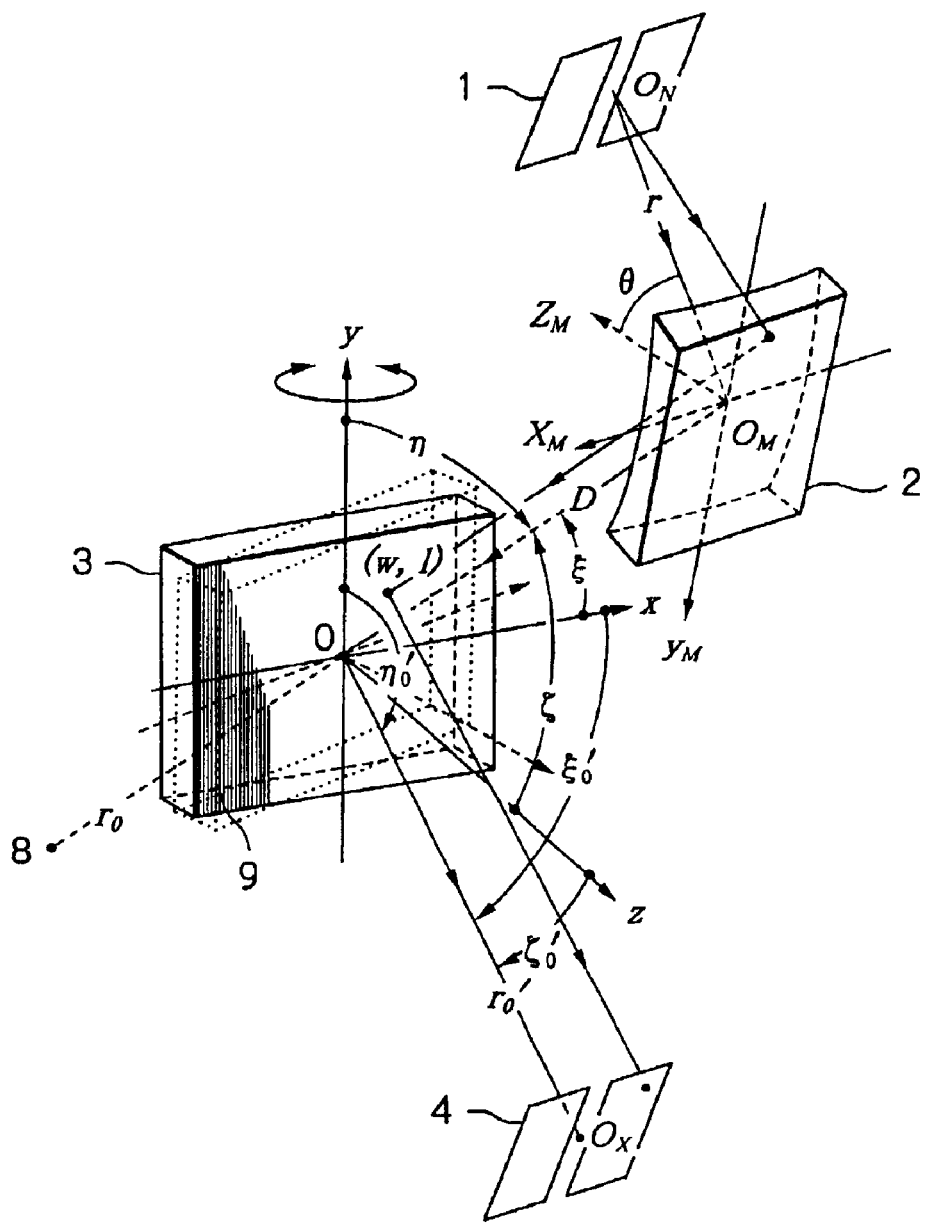
FIG. 1 is a schematic diagram showing the alignment of optical elements in a conical diffracting grazing incidence spectroscopic system according to an example of the invention.

FIG. 1 is a schematic diagram showing the mounting of optical elements in a conical diffracting grazing incidence spectroscopic system according to an example of the invention. In the system, light from the entrance slit 1 is reflected by the concave mirror 2 and converted to convergent light which then hits on the plane diffraction grating 3 (hereunder referred to simply as diffraction grating 3), where it is diffracted to be imaged at the exit slit 4. The x-, y- and z-axes are set in the grating plane of the diffraction grating such that the y-axis is parallel to the grooves in the diffraction grating, the x-axis is perpendicular to the grating grooves on the grating surface, and the z-axis is normal at the grating center. In the plane including the incident principal ray toward the diffraction grating and the diffracted principal ray emerging from the diffraction grating, the incident principal ray subtends angles of $(\xi,\eta,\zeta)$ with the (x,y,z) axes whereas the diffracted principal ray subtends angles of $(\xi_0',\eta_0',\zeta_0')$. The distance on the principal ray from the focal point of the convergent light reflected by the concave mirror to the center of the diffraction grating is written as r and the distance on the principal diffracted ray travels from the center of the diffraction grating to its focal point is written as $r_0'$.

The diffraction grating has non-uniformly spaced, curved grooves with an effective grating constant σ. The expansion coefficient $n_{ij}$ of the groove function for the diffraction grating with non-uniformly spaced grooves is expressed by the following equation which is a function of point coordinates (w,l) on the x-y plane of the diffraction grating:

$$n = \frac{1}{\sigma} \sum_{i,j} n_{ij} w^i l^j \quad (i+j \geq 1)$$

where n is the number assigned to each of the grooves in the diffraction grating and it assumes the value zero at the center of the diffraction grating where x=0 and y=0; the sign of n is positive or negative in accordance with the sign of the coordinate of the x-axis.

Similarly, the light path function F is expressed in the following expanded form which is a function of point coordinates (w,l) on the x-y plane of the diffraction grating:

$$F = \sum_{i,j} F_{ij} w^i l^j = \sum_{i,j} \left[ M_{ij} + \left(\frac{m\lambda}{\sigma}\right) n_{ij} \right] w^i l^j \quad (i+j > 0)$$

where $M_{ij}$ is a coefficient of an expanded term of the light path function, $M_{00}$ is the path length of the principal ray, $M_{10}$ and $M_{01}$ relate to the direction of dispersion (diffraction), $M_{20}$ and $M_{02}$ relate to the focal conditions in the directions of the x- and y-axes, respectively, and $M_{ij}$ (i+j>2) relates to the aberrations.

Figure 2:
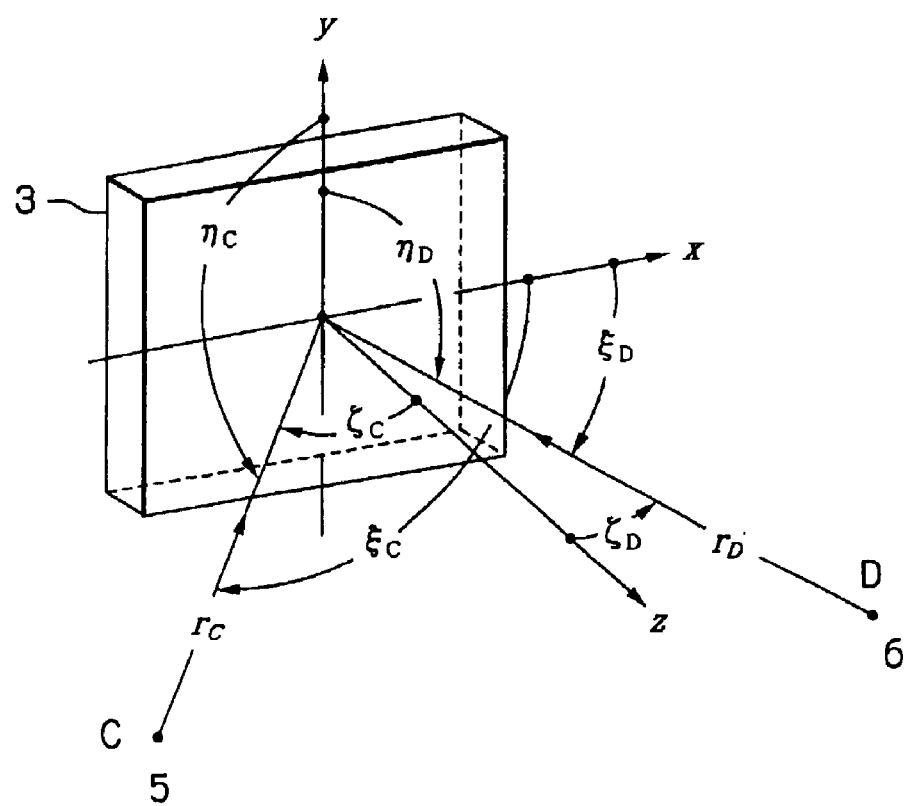
FIG. 2 is a schematic diagram showing the mounting of an optical element in a system for holographic recording of diffraction grating grooves.

In the case under consideration, $M_{ij}$ is expressed as follows:

$M_{00} = r + r_0,$ $M_{10} = -\cos\xi - \cos\xi_0',$ $M_{01} = -\cos\eta - \cos\eta_0',$ $M_{20} = \frac{\sin^2\xi}{2r} + \frac{\sin^2\xi_0'}{2r_0'},$ $M_{11} = \frac{\cos\xi\cos\eta}{r} + \frac{\cos\xi_0'\cos\eta_0'}{r_0'},$ $M_{02} = \frac{\sin^2\eta}{2r} + \frac{\sin^2\eta_0'}{2r_0'},$ $M_{30} = \frac{\cos\xi\sin^2\xi}{2r^2} + \frac{\cos\xi_0'\sin^2\xi_0'}{2r_0'^2},$ $M_{21} = \frac{\cos\eta(1 - 3\cos^2\xi)}{2r^2} + \frac{\cos\eta_0'(1 - 3\cos^2\xi_0')}{2r_0'^2},$ $M_{12} = \frac{\cos\xi(1 - 3\cos^2\eta)}{2r^2} + \frac{\cos\xi_0'(1 - 3\cos^2\eta_0')}{2r_0'^2},$ $M_{03} = \frac{\cos\eta\sin^2\eta}{2r^2} + \frac{\cos\eta_0'\sin^2\eta_0'}{2r_0'^2},$ FIG. 2 is a schematic diagram showing the mounting of an optical element in a system for holographic recording of diffraction grating grooves. Two coherent point sources such as laser beams C and D respectively indicated by 5 and 6 emit divergent rays which produce interference fringes on a diffraction grating substrate. The interference fringes are recorded as the grating grooves. If the distances of the principal rays with wavelength $\lambda_0$ travel from the point light sources C and D to the center of the diffraction grating are written as $r_C$ and $r_D$, respectively, and if the respective principal rays subtend angles $(\xi_C,\eta_C,\zeta_C)$ and $(\xi_D,\eta_D,\zeta_D)$ with the (x,y,z) axes, the expanded term $n_{ij}$ in the groove function is expressed as follows:

$n_{00} = r_D - r_C$ $n_{10} = \frac{\sigma}{\lambda_0}(-\cos\xi_C + \cos\xi_D),$ $n_{01} = \frac{\sigma}{\lambda_0}(-\cos\eta_C + \cos\eta_D),$ $n_{20} = \frac{\sigma}{\lambda_0}\left(\frac{\sin^2\xi_C}{2r_C} - \frac{\sin^2\xi_D}{2r_D}\right),$ $n_{11} = \frac{\sigma}{\lambda_0}\left(\frac{\cos\xi_C\cos\eta_C}{r_C} - \frac{\cos\xi_D\cos\eta_D}{r_D}\right),$ $n_{02} = \frac{\sigma}{\lambda_0}\left(\frac{\sin^2\eta_C}{2r_C} - \frac{\sin^2\eta_D}{2r_D}\right),$ $n_{30} = \frac{\sigma}{\lambda_0}\left(\frac{\cos\xi_C\sin^2\xi_D}{2r_C^2} - \frac{\cos\xi_D\sin^2\xi_D}{2r_D^2}\right),$ $n_{21} = \frac{\sigma}{\lambda_0}\left(\frac{\cos\eta_C(1 - 3\cos^2\xi_C)}{2r_C^2} - \frac{\cos\eta_D(1 - 3\cos^2\xi_D)}{2r_D^2}\right),$ $n_{12} = \frac{\sigma}{\lambda_0}\left(\frac{\cos\xi_C(1 - 3\cos^2\eta_D)}{2r_C^2} - \frac{\cos\xi_D(1 - 3\cos^2\eta_D)}{2r_D^2}\right),$ $n_{03} = \frac{\sigma}{\lambda_0}\left(\frac{\cos\eta_C\sin^2\eta_C}{2r_C} - \frac{\cos\eta_D\sin^2\eta_D}{2r_D^2}\right).$ To minimize aberrations, the expanded coefficients of the light path function which can be used to determine the mounting and recording conditions by the following method. First, $M_{00}$ is the term which represents the optical path length. If the diffraction grating has no focussing ability and if it is supposed that focussing is performed only by means of the concave mirror, $r_0'$ is equal to −r. $F_{10}$ and $F_{01}$ are so-called diffraction grating's equations and the concave mirror, the diffraction grating and the exit slit must be so arranged as to satisfy these equations. If $\eta_C=\eta_D$ for the sake of simplicity, $F_{01}=0$, so that $\eta_0'=180°-\eta$. If the axis of rotation of the diffraction grating, the incident principal ray and the diffracted principal ray are all assumed to lie in the same plane, $\xi_0'=\xi$ must be satisfied. From this condition and $F_{10}=0$, the value of $\xi$ is uniquely determined. $F_{20}$ and $F_{02}$ are equations that determine a meridional and a sagittal image point, respectively, and $F_{02}=0$ requires $r_C=r_D$. Substituting these into $F_{02}=0$, we get $\xi_C=180°-\xi_D$. The residual parameters to be determined are $r_C$ (=$r_D$) and $\eta_C$ (=$\eta_D$) and these would be determined from the condition of $F_{11}=0$.

A specific example of the spectrometer system designed in accordance with the invention is described below. The following numerical data are adopted: $r_0$ (the distance from the focal point of a convergent ray from the concave mirror to the center of the diffraction grating)=−5000 mm; σ (grating constant)=½₄₀₀ mm; m (diffraction order)=−1; φ (the angle the principal ray incident on the diffraction grating subtends in the x-z plane)=88.6°; wavelength range to be scanned=0.25–5 nm. If $\lambda_0$ or the wavelength of the laser is assumed to be 441.6 nm, the holographic exposing system that produces minimum aberrations is described by the following parameters: $r_C=r_D=2407.119$ mm; $\xi_C=180°-\xi_D=122.000°$; $\eta_C=\eta_D=118.769°$.

The values of $M_{ij}$, $H_{ij}$ and $F_{ij}$ for wavelengths of 0.25 nm, 1.0 nm and 5.0 nm are listed in Table 1 in order to demonstrate that the design method described above and the design based on that method contribute to minimizing the expanded terms in the light path function describing aberrations.

TABLE 1

| λ(nm) | 0.25 | 1.0 | 5.0 |
|---|---|---|---|
| $M_{10}$ | $6.000000 \times 10^{-4}$ | $2.400000 \times 10^{-3}$ | $1.200000 \times 10^{-2}$ |
| $H_{10}$ | $-6.000000 \times 10^{-4}$ | $-2.400000 \times 10^{-3}$ | $-1.200000 \times 10^{-2}$ |
| $F_{10}$ | $-2.769052 \times 10^{-16}$ | $-1.78675 \times 10^{-6}$ | $-1.717376 \times 10^{-16}$ |
| $M_{01}$ | 0 | 0 | 0 |
| $H_{01}$ | 0 | 0 | 0 |
| $F_{01}$ | 0 | 0 | 0 |
| $M_{20}$ (mm$^{-1}$) | 0 | 0 | 0 |
| $H_{20}$ (mm$^{-1}$) | 0 | 0 | 0 |
| $F_{20}$ (mm$^{-1}$) | 0 | 0 | 0 |
| $M_{11}$ (mm$^{-1}$) | $-1.199642 \times 10^{-7}$ | $-4.798567 \times 10^{-7}$ | $-2.399284 \times 10^{-6}$ |
| $H_{11}$ (mm$^{-1}$) | $1.199643 \times 10^{-7}$ | $4.798573 \times 10^{-7}$ | $2.399287 \times 10^{-6}$ |
| $F_{11}$ (mm$^{-1}$) | $1.529362 \times 10^{-13}$ | $6.117447 \times 10^{-13}$ | $3.058724 \times 10^{-12}$ |
| $M_{02}$ (mm$^{-1}$) | $-8.073283 \times 10^{-22}$ | $-8.073283 \times 10^{-22}$ | $8.073283 \times 10^{-22}$ |
| $H_{02}$ (mm$^{-1}$) | 0 | 0 | 0 |
| $F_{02}$ (mm$^{-1}$) | $-8.073283 \times 10^{-22}$ | $-8.073283 \times 10^{-22}$ | $8.073283 \times 10^{-22}$ |
| $M_{30}$ (mm$^{-2}$) | $-1.200000 \times 10^{-11}$ | $-4.799993 \times 10^{-11}$ | $-2.399914 \times 10^{-10}$ |
| $H_{30}$ (mm$^{-2}$) | $3.723635 \times 10^{-11}$ | $1.489451 \times 10^{-11}$ | $7.447263 \times 10^{-10}$ |
| $F_{30}$ (mm$^{-2}$) | $2.523631 \times 10^{-11}$ | $1.009453 \times 10^{-10}$ | $5.047348 \times 10^{-10}$ |
| $M_{21}$ (mm$^{-2}$) | 0 | 0 | 0 |
| $H_{21}$ (mm$^{-2}$) | $1.826316 \times 10^{-26}$ | $7.305264 \times 10^{-26}$ | $3.652632 \times 10^{-25}$ |
| $F_{21}$ (mm$^{-2}$) | $1.826316 \times 10^{-26}$ | $7.305264 \times 10^{-26}$ | $3.652632 \times 10^{-25}$ |
| $M_{12}$ (mm$^{-2}$) | $2.397851 \times 10^{-11}$ | $9.591404 \times 10^{-11}$ | $4.795702 \times 10^{-10}$ |
| $H_{12}$ (mm$^{-2}$) | $1.579711 \times 10^{-11}$ | $6.318845 \times 10^{-11}$ | $3.159423 \times 10^{-10}$ |
| $F_{12}$ (mm$^{-2}$) | $3.977562 \times 10^{-11}$ | $1.591025 \times 10^{-10}$ | $7.955126 \times 10^{-10}$ |
| $M_{03}$ (mm$^{-2}$) | $1.599431 \times 10^{-25}$ | $1.599431 \times 10^{-25}$ | $1.599431 \times 10^{-25}$ |
| $H_{03}$ (mm$^{-2}$) | 0 | 0 | 0 |
| $F_{03}$ (mm$^{-2}$) | $1.599431 \times 10^{-25}$ | $1.599431 \times 10^{-25}$ | $1.599431 \times 10^{-25}$ |

We next describe the method for calculating spot diagrams and spectral line profiles by ray tracing in order to evaluate the spectrometer system and the diffraction grating of the invention. For generating convergent light at $r_0$=−5000 mm, the entrance slit 1 (see FIG. 1) has a light source with a diameter of 2 μm that spreads through 0.2 mrad in the direction of the slit width and through 5 mrad in the height direction; the light from this light source falls on the toroidal mirror 2 located away from the entrance slit by a distance of r=5500 mm at an incident angle of θ=88.6° (the main curvature of the toroidal mirror in the direction of $X_M$ axis is 224085 mm and its auxiliary curvature in the direction of $Y_M$ axis is 114 mm); the incident light is reflected as a convergent beam which falls on the plane diffraction grating 3 located away from the toroidal mirror by a distance of D=450 mm. The size of the diffraction grating is 100 mm×100 mm in the direction of x- and y axes and all rays that pass outside this area shall be neglected.

Figure 3:
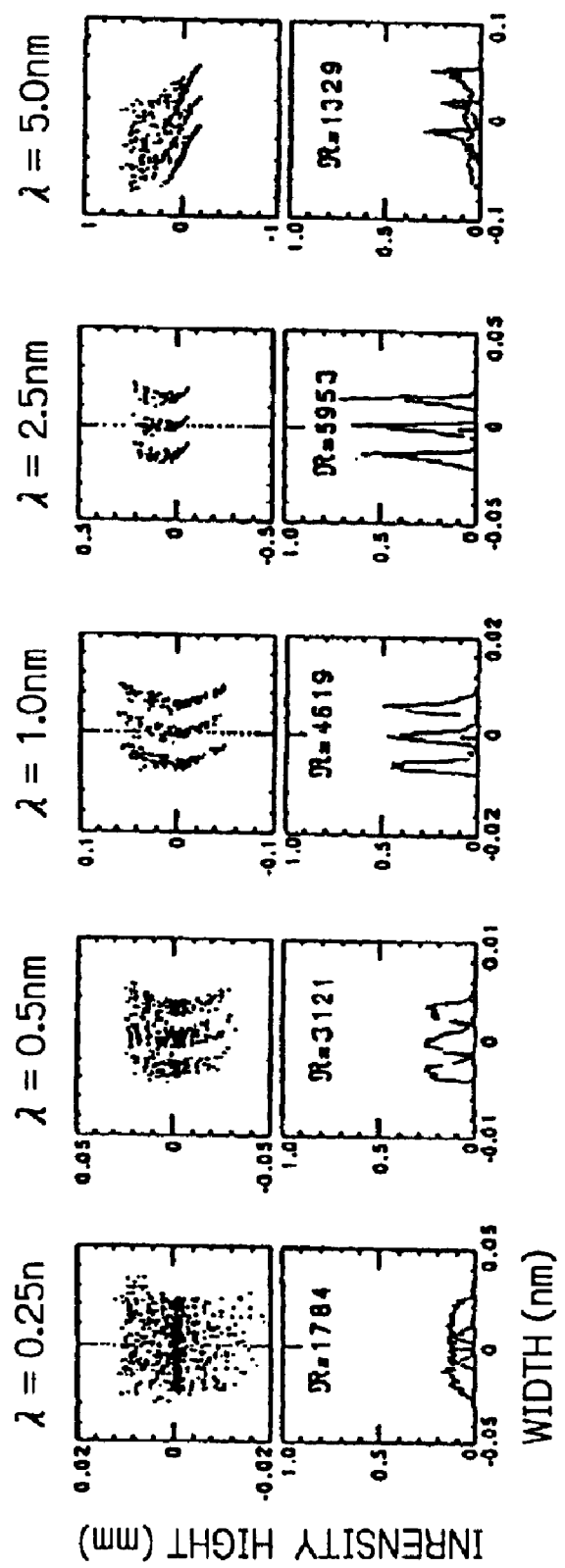
FIG. 3 is a set of spot diagrams and spectral line profiles obtained by ray tracing with specific parameters for the spectroscopic system and the diffraction grating of the invention.

FIG. 3 shows the spot diagrams and the spectral line profiles obtained by ray tracing with the optical arrangement set forth above for five principal wavelengths, λ: 0.25 nm, 0.5 nm, 1.0 nm, 2.5 nm and 5.0 nm. The three spectral lines having wavelength separation corresponding to a resolving power of 2000 are traced in each diagram. The actual values of the resolving power that can be achieved are indicated as those of ℜ in the spectral line profiles on FIG. 3. If the light source is assumed to be infinitesimally small, the resolving power ℜ is 3801 (for λ=0.25 nm), 4704 (λ=0.5 nm), 5896 (λ=1.0 nm), 6308 (λ=2.5 nm) and 1330 (λ=5.05 nm).

Figure 4:
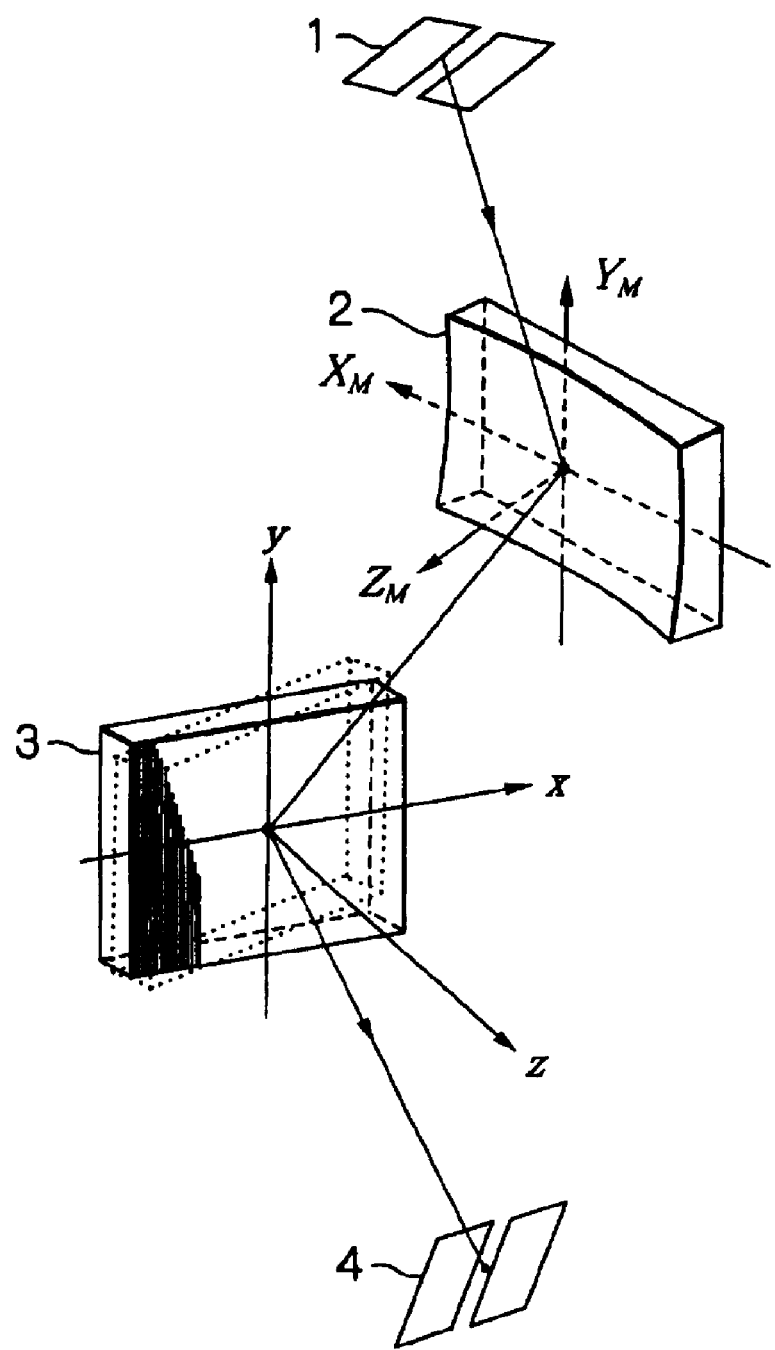
FIG. 4 is a schematic diagram showing another conical diffracting grazing incidence spectroscopic system to which the invention is applicable.
Figure 5:
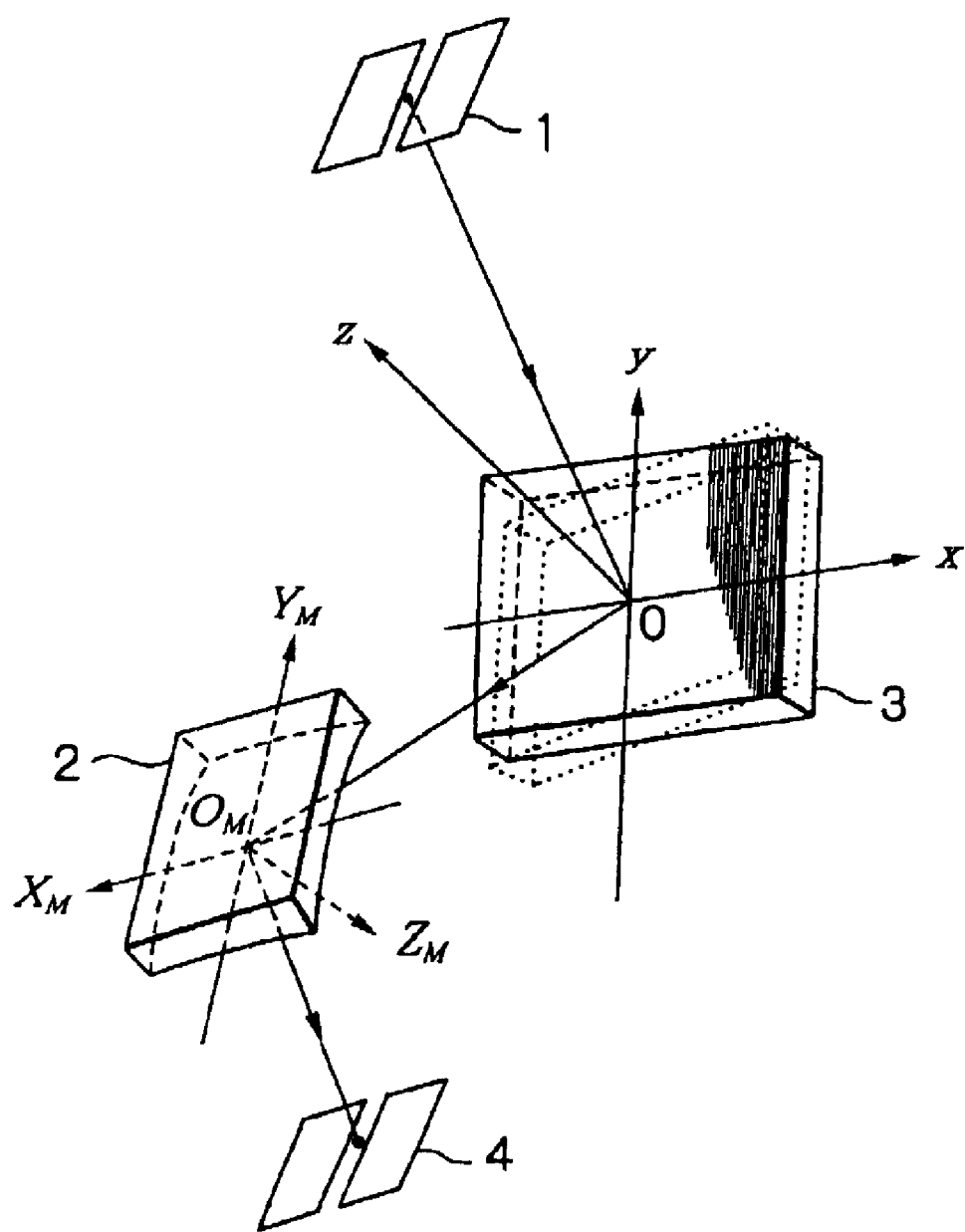
FIG. 5 is a schematic diagram showing still another conical diffracting grazing incidence spectroscopic system to which the invention is applicable.

While a specific example of the diffraction grating according to the invention has been described above, it should be noted that the invention is by no means limited to this particular example and various modifications are possible. For instance, in the spectrometer system shown in FIG. 1, the overall optical path extending from the entrance slit 1 to the exit slit 4 is included in the same plane but this is not an essential feature of the invention. If desired, the entrance slit 1 may be located out of the plane defined by the centers of the concave mirror, diffraction granting, and exit slit as shown in FIG. 4. Further, in the spectroscopic systems shown in FIGS. 1 and 4, the respective optical elements are arranged such that the light from the entrance slit 1 is rendered convergent by means of the concave mirror 2 and then received by the diffraction grating 3, with the emerging diffracted light being projected to the exit slit 4. If desired, the respective optical elements may be arranged as shown in FIG. 5 such that the light from the entrance slit 1 is first received by the diffraction grating 3 and that the emerging diffracted light is rendered convergent by means of the concave mirror 2, with the convergent light being then projected to the exit slit 4.

As described on the foregoing pages, in order to construct the diffraction grating of the invention, a groove-to-groove distance that will minimize aberrations is first determined by mathematical analysis and grating grooves are provided at the determined groove-to-groove distance. A conical diffracting oblique incidence spectroscopic system using this diffraction grating enables far more precise spectral analysis than the conventional system.

What is claimed is:

1. A conical diffraction grazing incidence spectroscope for performing wavelength scanning by rotating a diffraction grating about an is set parallel to grooves in a grazing surface of the grating comprising:
   a light source,
   an entrance slit,
   a convergent light generating means which causes divergent light from the light source through the entrance slit to be converted into convergent light,
   a diffraction grating positioned on an optical path from the light source to a focal point of the convergent light, and
   an exit slit, wherein the center of the entrance slit, the center of the exit slit, the center of the convergent light generating means and the center of the diffraction grating lie in the same plane, and wherein the grooves in the diffraction grating are either non-uniformly spaced or curved, both non-uniformly spaced and curved, or asymmetric in an axial direction normal to the direction of the grooves on the diffraction grazing surface at the center of the diffraction grating.

2. The spectrometer according to claim 1, wherein a concave mirror is used as a means which causes divergent light from the light source or through the entrance slit to be converted to convergent light.

3. The spectroscope according to claim 1, wherein the diffraction grating is a holographic diffraction grating fabricated by the interference fringes of two coherent divergent light rays which are emitted from two light sources.

4. The spectroscope according to claim 3, wherein the light sources for the two coherent divergent light rays both lie in the same potion of a region divided by a plane perpendicular to the axis of the grating at the center thereof.

* * * * *

UNITED STATES PATENT AND TRADEMARK OFFICE
CERTIFICATE OF CORRECTION

PATENT NO. : 6,891,615 B2
DATED : May 10, 2005
INVENTOR(S) : Masato Koike et al.

It is certified that error appears in the above-identified patent and that said Letters Patent is hereby corrected as shown below:

Column 6,
Line 58, replace "is" with -- axis --.

Signed and Sealed this

Twenty-fourth Day of January, 2006

JON W. DUDAS
*Director of the United States Patent and Trademark Office*